UNITED STATES PATENT OFFICE.

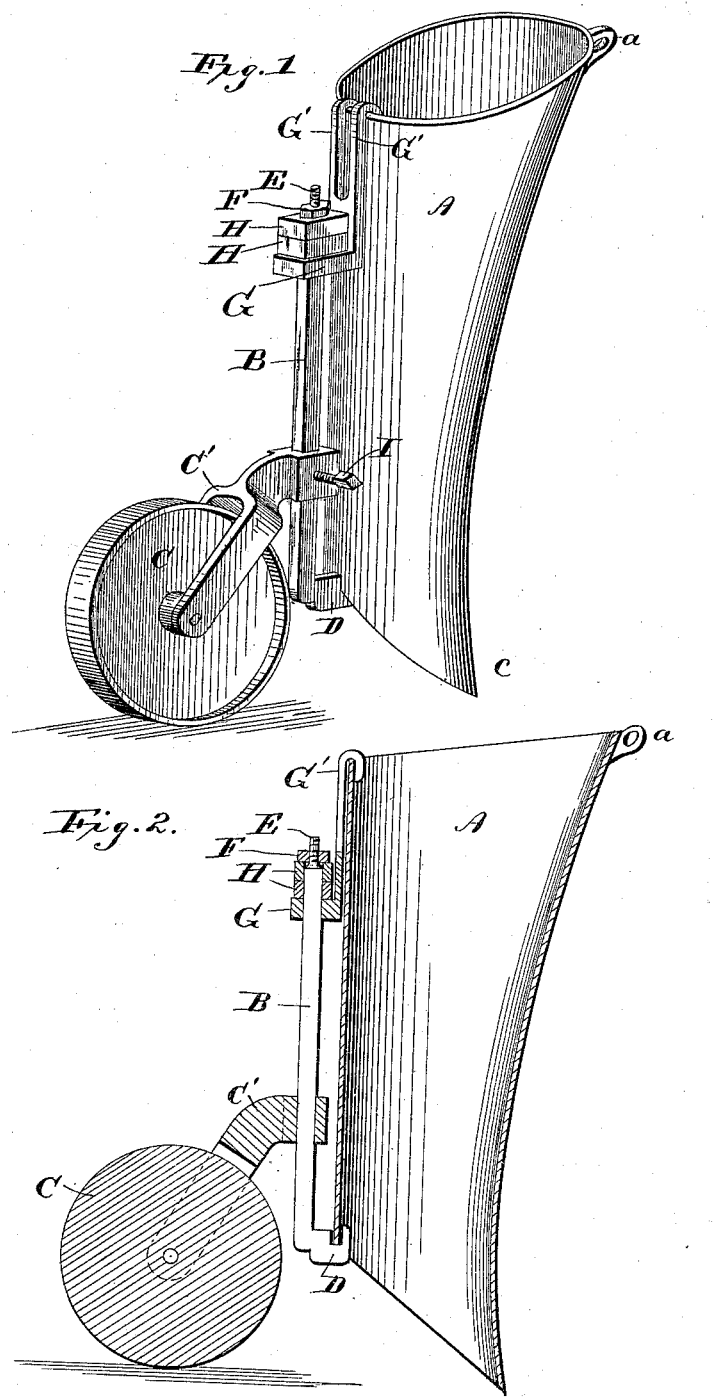

SPENCER F. BARBER, OF RUTHERFORD, PENNSYLVANIA.

SEED-DRILL GAGE.

SPECIFICATION forming part of Letters Patent No. 324,805, dated August 25, 1885.

Application filed June 9, 1885. (No model.)

*To all whom it may concern:*

Be it known that I, SPENCER F. BARBER, of Rutherford, in the county of Dauphin and State of Pennsylvania, have invented certain new and useful Improvements in Seed-Drill Gages; and I do hereby declare the following to be a full, clear, and exact description of the same, reference being had to the accompanying drawings, forming a part of this specification, and to the figures and letters of reference marked thereon.

My invention has for its object to provide an improved gage for seed-drill teeth that can be readily applied to machines now in use and can be adjusted so that their teeth may be permitted to enter the ground at any desired depth; and to these ends it consists in a certain novel construction, which I will now proceed to describe.

In the accompanying drawings, Figure 1 is a perspective view showing my improved gage applied to a drill-tooth, and Fig. 2 a longitudinal sectional view taken on the line $x\ x$ of Fig. 1.

Similar letters of reference in the several figures denote the same parts.

A represents a drill-tooth of any ordinary or preferred construction, having the projections $a\ b$ at front and rear, respectively, for attachment to the drill, and provided at its lower end with the furrow-opener or spade $c$.

B represents a rod or standard, on which the gage-wheel C is mounted, preferably made square to prevent the gage-wheel turning thereon, and secured to the drill-tooth in the following manner:

On the lower end of the rod B is a hook, D, adapted to be inserted inside the drill-tooth from below, and its upper end is provided with a rounded and screw-threaded portion, E, on which is mounted a nut, F. Also mounted upon the rod and adapted to slide up and down thereon is a bracket, G, having a square orifice fitting the rod, and the two upwardly-projecting hooks, G' G', adapted to hook over the upper end of the drill-tooth.

Instead of employing a double hook, a single one having a broad end will suffice, the object being to provide a broad bearing at the upper end of the tooth, so the rod will be prevented from turning.

Between the upper end of the bracket G and the nut F on the rod are one or more collars or washers, H H, preferably square, to fit the rod, and upon these the nut F bears.

The gage-wheel C is secured between the arms of a bifurcated bracket, C', the upper end of which is provided with a perforation fitting the rod B, and is adapted to be adjusted up and down upon the rod and to be held in adjusted position by means of the set-screw I, passing through the bracket and abutting against the rod. This gage-wheel runs upon the ground at the rear of the drill-tooth and regulates the depth to which the tooth enters it. When it is desired the tooth should enter deeper, the set-screw is loosened, the bracket and wheel raised, and the set-screw tightened again, and when desired to have them shallower the wheel is lowered, as will be readily understood.

To apply the gage it is only necessary to insert the hook D in the lower end of the tooth and the hooks G' G' over the upper end and tighten up the nut E, when the rod B will be rigidly secured to the tooth, and by reason of the two hooks on the bracket will be prevented from turning, while making the rod B square and providing the brackets with square perforations will prevent their turning on the rod.

The attachment herein described is very simple and can be readily applied to any drill-tooth and be adjusted to any desired depth without the exercise of any special skill on the part of the operator and without loss of time.

It will readily be understood that instead of the wheel an adjustable shoe or drag may be employed, and that it will answer all purposes; but I prefer the wheel, as it offers less resistance to the movement forward of the machine.

I claim as my invention—

1. As a means for detachably securing a gage-wheel to a drill-tooth, a frame carrying the gage-wheel and provided with a clamp for engaging the drill-tooth, said clamp being applicable to ordinary drill-teeth having no special provision for the attachment of a gage-wheel, substantially as described.

2. The combination of the rod, the adjustable gage-wheel mounted thereon, and the clamp for attaching said rod to an ordinary drill-tooth, substantially as described.

3. The combination, with the rod having the hooks for attaching it to the drill-tooth, of the gage wheel or shoe mounted on said rod and adapted to be adjusted thereon, substantially as described.

4. The combination, with the rod having the hook, of the adjustable hook mounted thereon and the gage wheel or shoe, substantially as described.

5. The combination of the square rod having the hook at one end, the adjustable hook mounted thereon, and the adjustable gage wheel or shoe, also mounted on the rod, substantially as described.

6. The combination of the rod having the hook at one end, the adjustable bracket having the broad hook or hooks, and the adjustable gage wheel or shoe, substantially as described.

SPENCER F. BARBER.

Witnesses:
FRED. M. OTT,
M. W. JACOBS.